United States Patent
Addabbo

[15] 3,674,987
[45] July 4, 1972

[54] AIRCRAFT NAVIGATIONAL CALCULATOR

[72] Inventor: Nunzio P. Addabbo, P.O. Box 926, Copperhill, Tenn. 37317

[22] Filed: June 16, 1971

[21] Appl. No.: 153,571

[52] U.S. Cl. .......................................... 235/88, 235/61 NV
[51] Int. Cl. ......................................... G06c 3/00, G06g 7/78
[58] Field of Search ................................. 235/88, 78, 61 NV

[56] References Cited

UNITED STATES PATENTS

| | | | |
|---|---|---|---|
| 2,339,959 | 4/1941 | Gray | 235/78 |
| 2,586,058 | 2/1952 | Knopke | 235/83 |
| 3,315,887 | 4/1967 | Martin, Jr. | 235/61 NV |
| 3,609,299 | 9/1971 | Wright | 235/61 NV |

*Primary Examiner*—Stephen J. Tomsky
*Attorney*—Lamont Johnston

[57] ABSTRACT

A calculator, which enables a pilot of an aircraft to determine the distance of the aircraft from a VOR station when the ground speed of the aircraft is known or the ground speed of the aircraft when the distance of the aircraft from the VOR station is known, includes a circular base member having a scale in terms of time thereon. A member is rotatably mounted on the base member and has a plurality of concentrically arranged scales in terms of distance to the VOR station with each scale being for a different ground speed of the aircraft. When a pointer on the rotatable member is aligned at the time required to fly between two bearing radicals of the VOR station that are 20° apart, a transparent fixed indicator having a hairline radially aligned with the center of rotation of the rotatable member and concentrically arranged marks engaging the hairline with each mark representing one of the ground speeds of the aircraft enables either the distance of the aircraft from the VOR station to be determined with the ground speed known or vice versa. The base member has three circular concentric scales on its opposite side divided into 10° increments to indicate the required heading of the aircraft to fly between two bearing radials that are 10° apart.

10 Claims, 3 Drawing Figures

INVENTOR
NUNZIO P. ADDABBO

ATTORNEY

AIRCRAFT NAVIGATIONAL CALCULATOR

In flying an aircraft, pilots can ascertain their ground speed if they know their distance from a VOR (VHF omnirange) station through crossing two VOR radials, which are 10° apart, normal to the average of the radials. Similarly, by executing the same maneuver and knowing the ground speed of the aircraft, the pilot can determine the distance from the VOR station after determining the time required to fly between the two bearing radials, which are 10° apart.

For the pilot to be able to determine the distance from the VOR station if the ground speed is known or to determine the ground speed of the aircraft if the distance of the aircraft from the VOR station is known, it is necessary for the pilot to remember and solve particular formulas. This requires both time and memory. If the pilot should fail to recall the formulas correctly or solves the formulas incorrectly, then the safety of the aircraft could be affected.

Some aircraft have electronic distance measuring equipment installed. However, this equipment is relatively expensive. If this equipment should fail, then the pilot again must rely upon memory of the formulas and capability of solving them to determine either the ground speed of the aircraft or the distance of the aircraft from the VOR station.

The present invention satisfactorily overcomes the foregoing problems by providing an aircraft navigational calculator in which it is only necessary for the pilot to fly across two VOR radials, which are 10° apart, and to measure the time for this. By knowing either the ground speed of the aircraft or the distance from the VOR station, the pilot can easily and quickly determine the other by using the calculator of the present invention.

Thus, there is no requisite for the pilot to remember any navigational formulas. Furthermore, the pilot does not have to solve these formulas after the necessary information is obtained so that there is no possibility of an error resulting therefrom.

Additionally, the calculator may easily be handled in one hand so that the pilot has the other hand free to fly the aircraft in a safe manner. Thus, the calculator of the present invention enables the pilot of an aircraft to quickly and safely ascertain either the ground speed or the distance from a VOR station.

The calculator of the present invention also has utility in an aircraft equipped with electronic distance measuring equipment. If the electronic distance measuring equipment should fail, the calculator will enable the pilot of the aircraft to quickly and easily ascertain the desired information.

Furthermore, in order for the pilot to be able to fly across two VOR bearing radials, which are 10° apart, and normal to the average of the two radials, it is necessary for the pilot to calculate the necessary heading of the aircraft relative to the "from" bearing of the VOR station. For inexperienced pilots, in particular, this is sometimes difficult to understand and to recall the direction in which the aircraft must head. Thus, if the pilot fails to head the aircraft in the proper direction, the flight across the VOR radials will not produce the necessary information.

Accordingly, the navigational calculator of the present invention also includes means to enable the pilot to determine the heading of the aircraft in accordance with the radials of the VOR station across which the pilot is going to fly so that the pilot will fly normal to the average of the two radials. Thus, when the pilot flys between VOR "from" bearing radials of a higher magnitude to a lower magnitude, the heading is 180° opposite to the heading if the pilot were flying in a direction between VOR "from" bearings of a lower magnitude to a higher magnitude. Thus, the pilot must add 90° to the average between the two radials when flying from the radial of lower magnitude to the radial of higher magnitude while the pilot must subtract 90° from the average between the two radials when flying from the radial of higher magnitude to the radial of lower magnitude.

As an example, if the pilot initially crosses the 60° "from" bearing radial of the VOR station and then crosses the 70° "from" bearing radial of the VOR station, a heading of 155° would be flown. However, if the pilot were to cross the 70° "from" bearing radial of the VOR station first and then cross the 60° "from" bearing radial, the aircraft would have to be headed in a direction of 335° for the proper information to be obtained.

The present invention enables this to be easily solved by the pilot. Accordingly, there is no possibility of the pilot flying in the wrong direction or even making a miscalculation as to the heading required.

An object of this invention is to provide an aircraft navigational calculator of the circular slide rule type.

Another object of this invention is to provide a calculator for determining the distance to a VOR station or the ground speed of an aircraft.

A further object of this invention is to provide a calculator for determining the heading of an aircraft to obtain the distance to the VOR station or the ground speed of the aircraft.

Still another object of this invention is to provide a relatively inexpensive calculator.

A still further object of this invention is to provide a calculator having only one movable member.

Other objects of this invention will be readily observed from the following description, claims, and drawings.

This invention relates to a calculator comprising a fixed circular base member having a circular arranged scale thereon along its periphery in terms of time with equal periods of time being equally angularly spaced from each other. A rotatable circular member, which has a smaller diameter than the base member, is rotatably supported on the base member and has a plurality of concentrically arranged scales thereon in terms of distance from an aircraft to a VOR station. Each of the scales on the rotatable member is related to a particular ground speed of the aircraft. The rotatable member has indicating means for cooperation with the scale on the base member. The base member has an indicator fixed thereto and overlying a portion of the rotatable member from at least the outermost of the scales on the rotatable member to at least the innermost of the scales on the rotatable member. The fixed indicator has a plurality of indicating means thereon with each being aligned with a different one of the concentrically arranged scales on the rotatable member.

The attached drawings illustrate preferred embodiments of the invention, in which.

Figure 1:
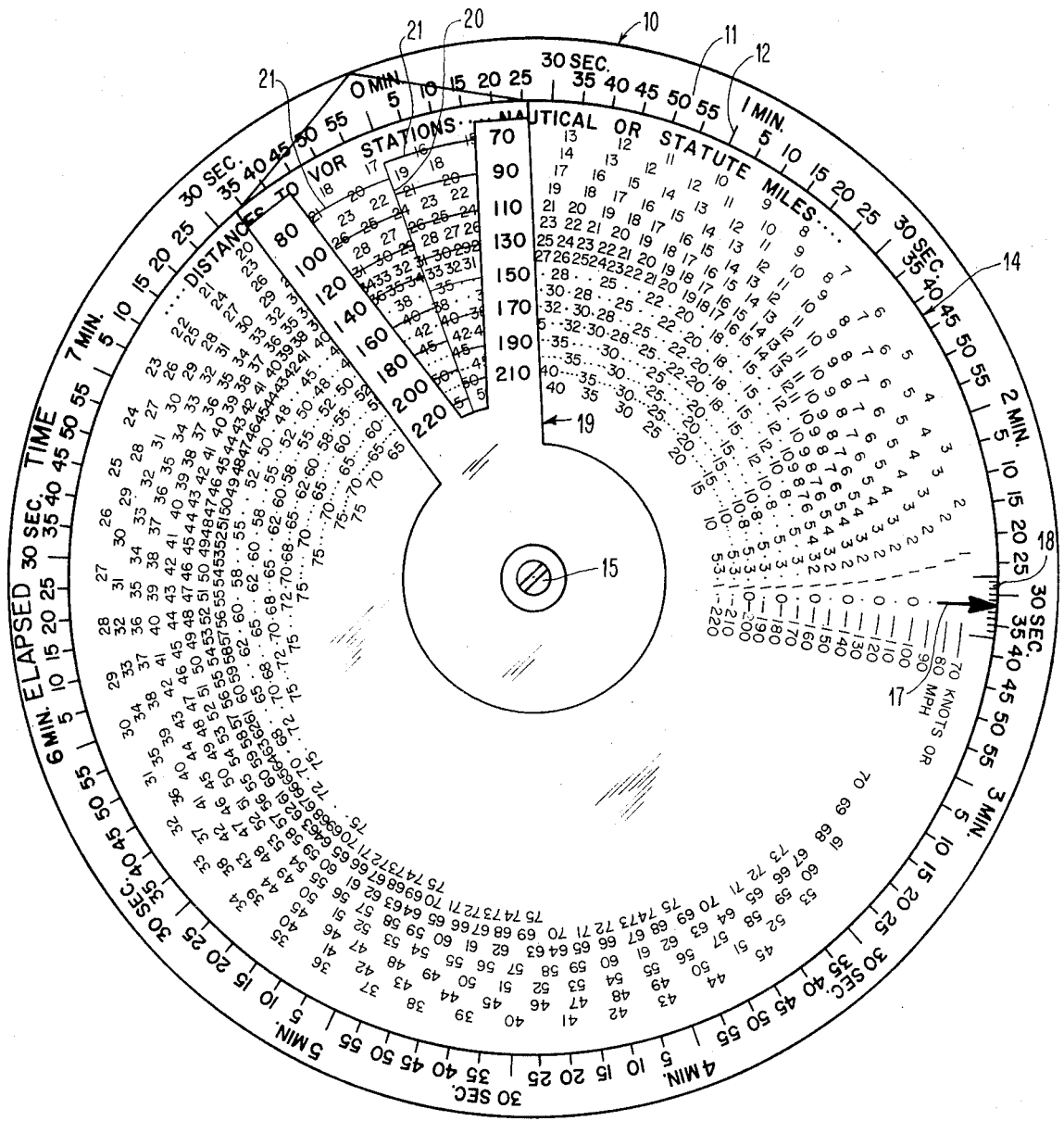
FIG. 1 is a top plan view of the calculator of the present invention taken from one side thereof.

Referring to the drawings and particularly FIG. 1, there is shown the calculator of the present invention. The calculator includes a circular base member 10 having a circularly arranged scale 11 on its periphery with the scale 11 having indicia 12 to indicate elapsed time for the aircraft to fly between two VOR radials, which are 10° apart, and normal to the average of the two radials. The scale 11 indicates elapsed time from 0 to 8 minutes.

Figure 2:
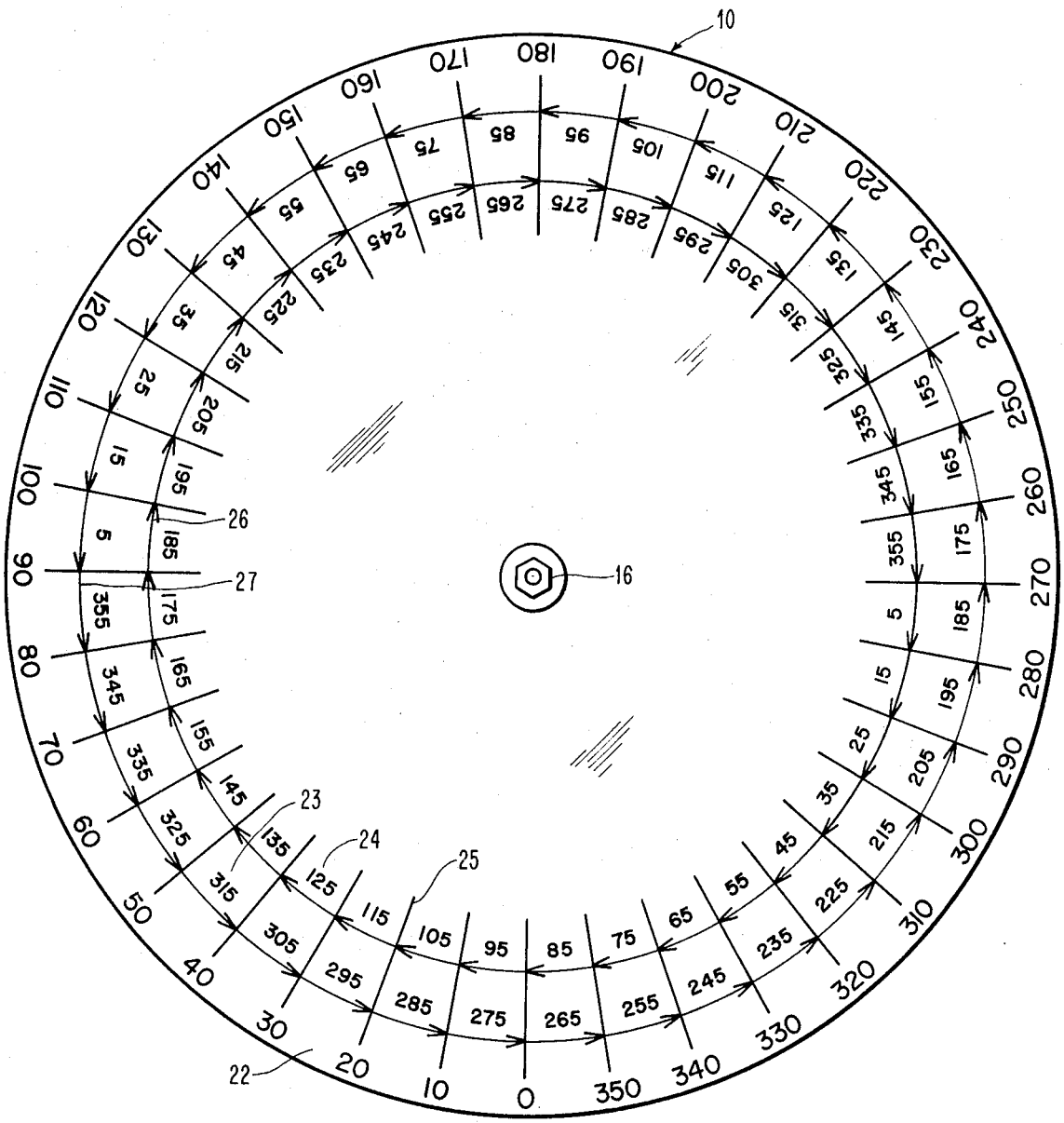
FIG. 2 is a top plan view of the other side of the calculator of FIG. 1.

A circular member 14, which has a smaller diameter than the base member 10, is rotatably mounted on the base member 10 by suitable means. For example, the rotatable member 14 can be rotatably mounted on the base member 10 through a screw 15 extending through the centers of the base member 10 and the rotatable member 14 and having a nut 16 (see FIG. 2) attached to the screw 15 so that the rotatable member 14 also is secured to the base member 10.

The rotatable member 14 has a plurality of concentrically arranged arcuate scales thereon with each of the scales indicating distance in miles, either nautical or statute depending upon whether the ground speed of the aircraft is in knots or miles per hour, to a VOR station from the aircraft. As shown in FIG. 1, the outermost scale on the rotatable member 14 is used when the ground speed of the aircraft is 70 knots or miles per hour. Similarly, the innermost of the scales on the rotatable member 14 is utilized when the ground speed of the aircraft is 220 knots or miles per hour.

The rotatable member 14 also has an arrow or pointer 17 fixed thereon for cooperation with the scale 11 on the base member 10. Thus, by rotating the rotatable member 14 so that the pointer 17 is aligned with the elapsed time on the scale 11 of the base member 10, the rotatable member 14 is properly positioned with respect to the fixed base member 10 to enable the user to ascertain either the distance from the aircraft to the VOR station or the ground speed of the aircraft with the other of these two known.

Because the scale 11 is divided into increments of 5 seconds, a vernier 18 has marks provided on each side of the pointer 17. The vernier 18 has five of the marks on each side of the pointer 17 so that the pointer 17 may be properly positioned at the particular second on the elapsed time scale 11 since the distance between two of the marks of the vernier 18 is 1 second. In fact, the vernier 18 enables the operator to be able to estimate portions of a second if necessary.

The rotatable member 14 has a transparent indicator 19 mounted thereabove as shown in FIG. 1. The upper end of the indicator 19 is fixed to the base member 10 so that a hairline 20 on the indicator 19 extends radially inwardly along a radial line from 0 minutes on the scale 11 to the center of rotation for the rotatable member 14.

The indicator 19 has a plurality of concentrically arranged marks 21 thereon with each of the marks 21 being adapted to overlie one of the concentrically arranged scales on the rotatable member 14. Thus, the uppermost of the marks 21 on the indicator 19 overlies the uppermost of the concentrically arranged scales on the rotatable member 14. Accordingly, the intersection of the uppermost of the marks 21 with the hairline 20 produces a reading of the distance in either nautical or statute miles, when the ground speed is 70 knots or miles per hour. Likewise, if the distance measured from the VOR station falls at the intersection of the uppermost of the marks 21 and the hairline 20, then the ground speed of the aircraft would be 70 knots or miles per hour depending on whether the distance was in nautical or statute miles.

Similarly, the innermost of the marks 21 is aligned with the innermost of the concentrically arranged scales on the rotatable member 14. Thus, the innermost of the marks 21 is used when ground speed is 220 knots or miles per hour.

Additionally, to enable more easier reading of the scales on the rotatable member 14 by the user, the concentrically arranged marks 21 are alternated on opposite sides of the radial hairline 20. Thus, as shown in FIG. 1, the marks for all speeds beginning with an odd number are on the right hand side of the hairline 20 while the marks 21 for all speeds beginning with an even number are on the left hand side of the radial hairline 20.

Accordingly, after crossing the two radials, which are 10° apart, of the VOR station, it is only necessary for the pilot to ascertain the time to fly between these two radials by a timer. When this has been determined, the pointer 17 is set at the elapsed time on the scale 11 of the base member 10. If the seconds are not at the exact increment, the marks of the vernier 18 are utilized so that the pointer 17 is properly positioned.

If the ground speed of the aircraft is known and it is desired to ascertain the distance of the aircraft from the VOR station, then the pilot uses the mark 21 for that ground speed. The pilot ascertains the distance on the scale of the rotatable member 14 at the intersection of the hairline 20 and the mark 21 for that ground speed.

If the distance of the aircraft from the VOR station is known and it is desired to ascertain the ground speed of the aircraft, then this distance is located on the hairline 20. If the distance is exactly on the hairline 20, then the mark 21 intersecting the hairline 20 at that particular distance indicates the ground speed of the aircraft. However, if the distance is not on the hairline 20, then the pilot must estimate the ground speed between two of the marks 21.

Thus, as shown in FIG. 1, the elapsed time is 2 minutes and 32 seconds. With this time and a known ground speed of 100 miles per hour, for example, the distance of the aircraft from the VOR station is 24 statute miles. If the distance of 24 miles from the VOR station had been known and the ground speed had not been known, then the intersection of the hairline 20 with the distance of 24 miles would have shown that the mark 21 for the 100 miles per hour speed intersected the hairline 20 at this point. If the distance had been 30 stature miles with the elapsed time being 2 minutes and 32 seconds, then the ground speed of the aircraft would be approximately 125 miles per hour.

The other side of the base member 10 to that having the scale 11 has three circular scales 22, 23, and 24 thereon. Each of the scales 22, 23, and 24 is divided into 10° (see FIG. 2) increments with the outer scale having even numbers and the scales 23 and 24 having odd numbers.

Each of the even numbers on the outer scale 22 has a radial line 25 extending therefrom toward the center of the base member 10. With the center of the base member 10 representing the VOR station, each of the radial lines 25 represents a radial from the VOR station so that the numbers on the scale 22 represent "from" bearings.

The innermost scale 24 indicates the heading of the aircraft required to fly normal to the average of the two radials when progressing from the lower magnitude of the two "from" bearings to the higher magnitude of the two "from" bearings. As an example, when flying from the 100° radial to the 110° radial, the heading for the aircraft would be 195°. The scale 24 has arrows 26 associated with each of the numbers of the scale 24 to show that the aircraft first crosses the radial representing the 100° "from" bearing and then crosses the radial representing the 110° "from" bearing. As is readily determined, the 195° heading is 90° greater than the average of the 100° and 110° radials.

If the aircraft were to fly from the 110° "from" bearing to the 100° "from" bearing, then the center scale 23 would be employed. The scale 23 has arrows 27 associated with each of the numbers of the scale 23 to indicate that the aircraft flys from the 110° radial to the 100° radial so that the aircraft flys from the "from" bearing of higher magnitude to the "from" bearing of lower magnitude. Thus, when flying from the 110° radial to the 100° radial, the heading of the aircraft would be 15°. This is obtained by subtracting 90° from the average of the 100° and 110° radials.

As a detailed example of how the calculator of the present invention functions, it is necessary to tune in and identify the VOR station that will be employed. Then, the omnibearing selector is turned until the needle is centered so as to obtain the approximate "from" bearing of the VOR station.

If the aircraft is heading north and the "from" bearing is 115°, then the pilot would select 10° of VOR radials slightly ahead of 115°. Since the aircraft is flying north (0°), the aircraft would fly from the 110° "from" bearing to the 100° "from" bearing so that the scale 23 would be employed. The scale 23 indicates 15° between the 100° and 110° radials so that the headings of the aircraft would be turned from 0° to 15°; this heading results in the aircraft flying normal to the average of the two radial "from" bearings of 100° and 110°.

Thus, the heading of 15° of the aircraft would be taken up and the omnibearing selector would be turned to 110°, which is the first of the two radials to be crossed. A constant speed would be maintained and the pilot would start the timer when the needle on the omnibearing selector centers.

As soon as the needle has centered and the timer has been started, the omnibearing selector is rotated to the second radial, which is to be crossed. In this example, this would be the radial for the 100° "from" bearing. When the needle again centers, the timer is stopped, and the elapsed time is noted.

If this elapsed time is 2 minutes and 32 seconds as used in FIG. 1, then the pointer 17 on the rotatable member 14 would be disposed as shown in FIG. 1 through rotating the rotatable member 14. With the ground speed of the aircraft known, then the intersection of the mark 21 on the indicator 19 for the known ground speed with the hairline 20 would indicate the distance of the aircraft from the VOR station.

If the distance of the aircraft from the VOR station were known and the ground speed of the aircraft were not, then the distance would be located on the hairline 20. The intersection with the hairline 20 of the mark 21 for this distance would indicate the ground speed. If the distance were to fall between two of the marks 21, then the pilot would determine the approximate speed between the two ground speeds represented by the two marks 21.

If the aircraft had been flying due south (180°) rather than due north, then the pilot would have flown from the 100° radial to the 110° radial so that the pilot would have used the heading on the scale 24. Thus, this would have indicated a heading of 195°. Of course, after changing the heading to 195°, it also would have been necessary to first set the omnibearing selector to 100° and start the timer when the aircraft crossed the 100° radial as indicated by the needle centering. Then, the omnibearing selector would be set at 110° and the timer stopped when the aircraft crossed the 110° radial as indicated by the needle centering. The remainder of the steps would have been the same.

When crossing the 10° of VOR radials, normal to the average of the radials, the formula for distance to the VOR station is:

$$D = \frac{\frac{M}{60} \times \frac{R}{2}}{\sin 5°}.$$

In this formula, $M$ is the time required to cross 10° of VOR radials in minutes, $R$ is the ground speed of the aircraft, and $D$ is the distance of the aircraft from the VOR station. Using the same formula to determine the ground speed of the aircraft, the formula for ground speed is:

$$R = 2\left(\frac{60 D \sin 5°}{M}\right).$$

While the calculator of the present invention has been designed for the pilot crossing radials, which are 10° apart, it may be necessary for the pilot to fly across 20° of radials when flying close to the VOR station at fast speeds. When the pilot does this, it is only necessary to halve the distance on the scales on the rotatable member 14. When flying across only 5° of radials because of being far from the VOR station or for a fast distance check, it would only be necessary to double the distance of the concentrically arranged scales on the rotatable member 14.

Figure 3:
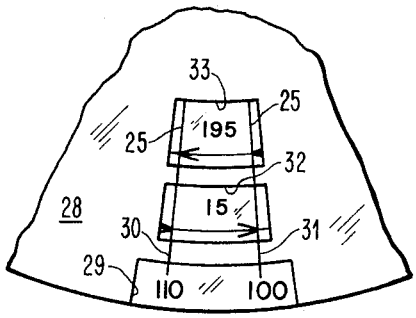
FIG. 3 is a fragmentary plan view of a portion of the calculator of the present invention and showing another embodiment.

If desired, the scales 22, 23, and 24 could be covered by a circular member 28 (partially shown in FIG. 3), which would be rotatably mounted on the base member 10 on the side opposite to the rotatable member 14 and have the same diameter as the base member 10. If this were done, the member 28 would have an arcuate slot 29 in its periphery of slightly greater circumferential distance than that between two of the bearing radials as shown in FIG. 3. The member would have two marks 30 and 31 spaced from each other the distance of two of the 10° radial lines 25 so that the marks 30 and 31 could be aligned with two of the radial lines 25 as shown in FIG. 3.

The member 28 has a window 32 to expose only one of the numbers on the scale 23 and a window 33 to expose only one of the numbers on the scale 24. This occurs only when the marks 30 and 31 are aligned with two of the radial lines 25.

An advantage of this invention is that it requires only one hand to use. Another advantage of this invention is that it reduces pilot error. A further advantage of this invention is that it conserves time. Still another advantage of this invention is that it eliminates time consuming computations, either mental or long hand.

For purposes of exemplification, particular embodiments of the invention have been shown and described according to the best present understanding thereof. However, it will be apparent that changes and modifications in the arrangement and construction of the parts thereof may be resorted to without departing from the spirit and scope of the invention.

What is claimed is:

1. A calculator comprising a fixed circular base member having a circularly arranged scale thereon along its periphery in germs of time with equal periods of time being equally angularly spaced from each other, a rotatable circular member having a smaller diameter than said base member and rotatably supported thereon, said rotatable member having a plurality of concentrically arranged scales thereon in terms of distance from an aircraft to a VOR station, each of the scales on said rotatable member being related to a particular ground speed of the aircraft, said rotatable member having indicating means for cooperation with the scale on said base member, an indicator fixed to said base member and overlying a portion of said rotatable member from at least the outermost of the scales on said rotatable member to at least the innermost of the scales on said rotatable member, and said fixed indicator having a plurality of indicating means thereon with each being aligned with a different one of the concentrically arranged scales on said rotatable member.

2. The calculator according to claim 1 in which said base member has a plurality of concentrically arranged circular scales on the opposite side thereof from the side having said rotatable member adjacent thereto, each of the scales being divided into 10° increments, one of the scales indicating the bearing from a VOR station, a second of the scales indicating the heading of the aircraft to fly between two of the bearings of the one scale when the aircraft is to be flown from a bearing of higher magnitude to a bearing of lower magnitude, a third of the scales indicating the heading of the aircraft to fly between two of the bearings of the one scale when the aircraft is to be flown from a bearing of lower magnitude to a bearing of higher magnitude, at least one of the second and third scales having means to indicate when the scale is to be used as the one indicating the heading of the aircraft, and each of the 10° increments on each of the second and third scales being disposed between two of the 10° increments on the one scale.

3. The calculator according to claim 2 in which each of the second and third scales has means to indicate when the second or third scale is to be used as the one indicating the heading of the aircraft.

4. The calculator according to claim 3 in which said indicating means on the second scale comprises arrows pointing in one direction and said indicating means on the third scale comprises arrows pointing in the opposite direction to the one direction.

5. The calculator according to claim 4 in which said fixed indicator is transparent and said indicating means of said fixed indicator includes a hairline extending radially toward the center of said base member from at least the outermost of the concentric scales on said rotatable member to the innermost of the concentric scales on said rotatable member and concentrically arranged marks cooperating with said hairline, each of said marks cooperating with a different one of the concentrically arranged scales on said rotatable member.

6. The calculator according to claim 4 in which said indicating means on said rotatable member includes a pointer and vernier marks on each side for cooperation with indicia on the scale on said base member to divide the time period into smaller increments.

7. The calculator according to claim 2 including indicating means rotatably supported on said base member and cooperating with the scales on the side of said base member opposite from the side of said base member having said rotatable member adjacent thereto; and said indicating means includes a pair of marks to cooperate with two adjacent of the 10° bearing increments on the one scale, a first window for cooperation with the 10° bearing increments on the second scale to expose only one of the 10° bearing increments on the second scale when said marks are aligned with radial lines for two adjacent of the 10° bearing increments on the one scale, and a second window for cooperation with the 10° bearing increments on the third scale to expose only one of the 10° bearing increments on the third scale when said marks are aligned with radial lines for two adjacent of the 10° bearing increments on the one scale.

8. The calculator according to claim 1 in which said base member has a plurality of concentrically arranged circular scales on the opposite side thereof from the side having said rotatable member adjacent thereto, each of the scales being divided into 10° increments, one of the scales indicating the bearing from a VOR station, at least one other of the scales indicating the heading of the aircraft to fly between two of the bearings of the one scale, and each of the 10° increments on the other scale being disposed between two of the 10° increments on the one scale.

9. The calculator according to claim 1 in which said fixed indicator is transparent and said indicating means of said fixed indicator includes a hairline extending radially toward the center of said base member from at least the outermost of the concentric scales on said rotatable member to the innermost of the concentric scales on said rotatable member and concentrically arranged marks cooperating with said hairline, each of said marks cooperating with a different one of the concentrically arranged scales on said rotatable member.

10. The calculator according to claim 1 in which said indicating means on said rotatable member includes a pointer and vernier marks on each side for cooperation with indicia on the scale on said base member to divide the time period into smaller increments.

* * * * *